United States Patent [19]
Bahder et al.

[11] 3,942,031
[45] Mar. 2, 1976

[54] HIGH VOLTAGE FLEXIBLE CABLE SUPPORTED BY A CONTINUOUS RIGID BRIDGE FOR FLOATING PLATFORMS

[75] Inventors: George Bahder, Edison; George S. Eager, Jr., Upper Montclair, both of N.J.

[73] Assignee: General Cable Corporation, Greenwich, Conn.

[22] Filed: Nov. 19, 1974

[21] Appl. No.: 525,193

[52] U.S. Cl. .................. 307/147; 60/721; 61/4; 61/46.5; 174/42; 174/43; 174/70 R; 176/87; 248/49
[51] Int. Cl.² H02G 3/00; H02G 11/00; G21D 1/00
[58] Field of Search .......... 174/1, 37, 40 R, 42, 43, 174/68 R, 69, 70 R, 86; 307/147; 9/8 P, 400; 52/573; 60/721; 61/3, 46.5, 63; 114/.5 R, .5 F, 43.5 R, 235 R, 235 A; 176/87; 191/1 R, 12 R; 248/49, 68 R, 258 R

[56] References Cited
UNITED STATES PATENTS

| | | | |
|---|---|---|---|
| 3,130,704 | 4/1964 | Romero | 114/235 R |
| 3,605,413 | 9/1971 | Morgan | 174/70 R UX |
| 3,794,849 | 2/1974 | Perry et al. | 174/70 R X |
| 3,813,477 | 5/1974 | Fischer | 174/70 R |

*Primary Examiner*—Laramie E. Askin
*Attorney, Agent, or Firm*—Hopgood, Calimafde

[57] ABSTRACT

This invention carries a power cable from a floating power plant to a fixed connection from which the power cable can transmit to a distributing system on shore. The cable support distributes the bending of the cable over a length of cable so that no deterioration of the cable occurs as the result of successive bending and unbending with the tidal motion of the floating power plant. A jointed cover protects the cable support from exposure to the weather and from icing.

16 Claims, 4 Drawing Figures

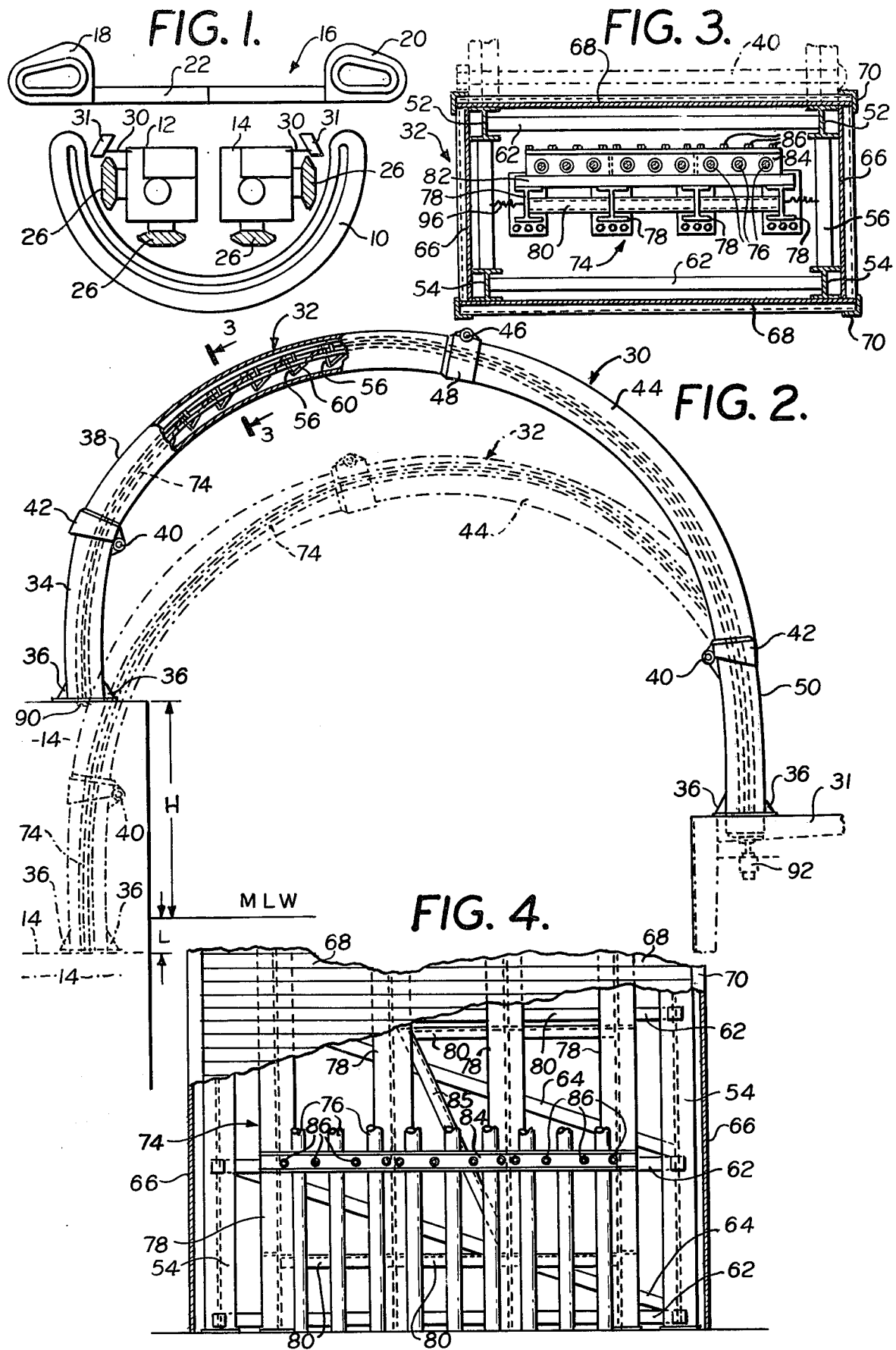

3,942,031

HIGH VOLTAGE FLEXIBLE CABLE SUPPORTED BY A CONTINUOUS RIGID BRIDGE FOR FLOATING PLATFORMS

BACKGROUND AND SUMMARY OF THE INVENTION

This invention is a structure for transmitting power from a power generating plant, particularly a nuclear plant, mounted on a floating platform in tidal water. The cable for connecting the power plant with a fixed location from which the power distribution travels to an on shore distributing system bends when the floating power station raises and falls with changes in the level of the water. Over a long period of time such bending of the cable back and forth will deteriorate the cable unless the bending is distributed over such a long length of cable that the local bending at any region is extremely small.

This invention supports the power cable on a frame which extends from the generating station to the fixed station; and the frame is constructed so that it bends along an arc which is of a length at least as great as the major part of the distance from the generating station to the fixed station.

In the preferred construction, the frame is shaped to an arc of approximately 180°, and the center line of the frame lies in a substantially vertical plane. By connecting the ends of the frame with the respective stations by connections which do not permit any angular movement of the frame with respect to the stations, any vertical movement of the generating station up and down with changes in the water level will be accommodated by localized changes in the radius of curvature of the frame along substantially the entire length of the arc.

The amount of flexing of the cable with changes in the relative level of the two stations can be made as small as desired by increasing the length of the frame. In order to protect the frame from wind and from weather conditions, particularly ice loading from freezing rain, there is a cover which extends over the frame, and preferably along the entire length thereof.

The cover is preferably made in two rigid sections which are connected together by a joint. The opposite ends of the cover are secured to the respective stations by other joints. The cover does not bend, but moves at the joints to accommodate changes in the respective levels of the different stations. Since the frame bends and the cover has rigid sections with hinge connections, the shapes of the frame and cover do not remain the same as the floating station moves up and down with respect to the fixed station. The inside cross-section of the cover is made large enough to accommodate the changes in curvature of the frame and the movements of the cover with respect to the frame as the result of differences in the shape of the frame and cover with different levels of the floating power plant.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of the floating power plant and fixed caisson with which this invention is used;

FIG. 2 is an elevation of the cable supporting structure of this invention and showing its connection to the floating power plant and the fixed station;

FIG. 3 is a greatly enlarged sectional view taken on the line 3—3 of FIG. 2; and FIG. 4 is an enlarged top plan view, partly broken away, of the structure shown in FIG. 3.

DESCRIPTION OF PREFERRED EMBODIMENT

FIG. 1 shows a breakwater 10 which is built up from the sea bottom; a rigid structure to provide calm water behind it for two floating power plants 12 and 14. The space behind the breakwater 10 is further protected by a second breakwater 16 which consists of two rigid structures 18 and 20 which are built up from the sea bottom like the breakwater 10; but there are removable caissons 22 spanning the space between the structures 18 and 20. These caissons 22 are made removable so that the floating power plants 12 and 14 can be floated into position behind the breakwater 16 and subsequently floated out again in the event that they have to be taken away for repairs on the hulls of floating platforms of the power plants 12 and 14.

Each of the floating power plants 12 and 14 is held in place behind the breakwater 10 by being connected with caissons 26 which extend up from the sea bottom. These caissons 26 are in fixed positions and the floating power plants 12 and 14 are connected with the caissons 26 by means which permit the floating power plants 12 and 14 to move up and down along the caissons 26 as necessary to accommodate the rise and fall of the tide.

Each of the floating power plants 12 and 14 has a support 30 for holding power cables which lead from the power plant to a fixed caisson 31 which extends upward from the sea bottom. This invention is concerned principally with the support 30.

The power cables are enclosed in a cover 32 which is made up of a number of rigid sections including a first section 34 which is rigidly connected to the power plant 14 by brackets 36. The brackets 36 prevent any angular movement of the first section 34 with respect to the floating power plant 14. At the upper end of the first rigid section 34, there is a second rigid section 38 which is connected with the first section 34 by a hinge 40.

The hinge 40 may be continuous across the width of the cover 32 or may include horizontally spaced portions at both sides of the cover 32 which is of rectangular cross-section as will be explained in connection with FIG. 3. The second section 38 of the cover has a boot 42 rigidly connected with its lower end in position to overlie the upper end of the first section 34 so as to prevent rain and snow from entering the cover 32 at the hinge joint 40.

The upper end of the second rigid section 38 is connected to a third rigid section 44 by a hinge joint 46. This hinge joint 46 permits angular movement of the sections 38 and 44 with respect to one another and there is a boot 48 covering the open ends of the sections 38 and 44 to prevent entrance of rain and snow into the cover 32 without interfering with a limited angular movement of the sections 38 and 44, as will be explained later.

The third rigid section 44 connects with another fixed section 50 which is secured to the fixed caisson 31 by brackets 36 which prevent any angular movement of the section 50 with respect to the caisson 31. The fixed section 50 is connected with the section 44 by another hinge joint 40 which is the same as that between the sections 34 and 38. There is also a boot 42, corresponding to the boot 42 on the other side of the frame 32.

The floating power plant 14 is shown in FIG. 2 at its highest position. This would correspond with high tide during a most severe storm when an excessively low barometer would cause the tide to be much higher than usual. With the floating power plant 14 in this high position, the cover 32 occupies the full line position shown in FIG. 2.

FIG. 2 also shows a broken line position for the power plant 14 when the water is low. This change in the relative level of the floating power plant 14 with respect to the fixed caisson 31 lowers the left hand end of the cover 32, as viewed in FIG. 2, and changes the position of the parts to the locations indicated by broken lines. Comparing the two positions, it will be evident that the third section 44 has swung counter clockwise about its hinge joint 40 at the upper end of the rigid and fixed section 50. During downward movement of the power plant 14 from the full line to the broken line position, the hinge joint 40 will permit counter clockwise movement of the second section 38 with respect to the first section 34 during the change in elevation of the brackets 36 on the power plant 14 to the level of the brackets 36 on the caisson 31, this being the condition that brings the hinges 40 closest to one another.

During further downward movement of the brackets 36 at the lower end of the first section 34, the hinge joint 40 permits the second section 38 to swing clockwise with respect to the first section 34. During this shift in the level of the power plant 14 through its maximum range of movement, the hinge joint 46 moves one way or the other, as necessary, to accommodate the change of distance between the hinge joints 40.

FIG. 3 is a sectional view through the cover 32. The cover is made with two upper beams 52 and two lower beams 54. These beams are connected, to form side frames, by vertical structural sections 56, connected at their upper and lower ends with the beams 52 and 54 by welding or other means. In order to provide a rigid truss construction for the side frames, there are diagonal structural sections 60 extending between the vertical sections 56 as shown on a smaller scale in FIG. 2. These diagonal sections 60 also welded into the corners where the upright sections 56 meet the upper and lower beams 52 and 54, respectively.

The upper beams 52 are connected to one another by cross frame sections 62 and the lower beam sections 54 are similarly connected to one another by cross frame sections 62. These cross frame sections 62 are welded to the beams 52 and 54 in the same manner as the vertical sections 56.

The cover 32 is given horizontal rigidity by welding diagonal cross frame structures 64 to the beams 54 at the junction of the webs of the beams 54 as shown in FIG. 4.

Referring again to FIG. 3, the cover 32 has corrugated sheathing 66 secured to its sides and has corrugated panels 68 forming top and bottom walls of the cover 32. FIG. 3 shows angle irons 70 covering the corners where the side walls 66 meet the top and bottom walls 68 so as to make the cover 32 more weather proof. FIG. 3 also shows one of the hinge joints 40 in broken lines.

Enclosed within the cover 32 there is a frame 74 which supports cables 76 that carry the generated power from the power station to the caisson 31. This frame 74 is made up of four H-beams 78 bent to arcuate shape, as indicated in FIG. 2, and parallel to one another. These beams 78 are held in parallel relation by welding spacer sections 80 between the webs of the adjacent beams 78 as shown in FIG. 3. On top of the beams 78 there are supports 82 at spaced locations along the length of the beams. On top of these supports 82 there are cable retainers 84 which are preferably split blocks with semi circular recesses in their confronting faces and with the recesses of a diameter to hold the cables 36 in spaced relation across the frame 74. The upper blocks are secured to the lower blocks by bolts 86 in the construction shown in FIG. 3.

The frame 74 has truss work across its width only and none in the direction in which it bends. The truss structure includes diagonal braces 85 welded at opposite ends to the innermost beams 78 adjacent to the successive cross frame sections 62. The beams 78 are thus free to bend and change the radius of curvature of their bends in accordance with the raising and lowering of the end of the frame 74 which is attached to the floating power plant.

Referring again to FIG. 2, the frame 74 is shown in dotted lines in the full line showing of the cover 32; and is shown in broken lines in the broken line showing of the cover 32.

The left hand end of the frame 74 is shown connected to the power plant 14 by a connection 90 which prevents any angular movement of the frame 74 with respect to the power plant 14. The right hand end of the frame 74 is similarly connected to the fixed caisson 31 and the cables in the caisson 31 have connections 92 with fixed cables for transmitting the power down the caisson 31 and across the sea bottom to distribution facilities on shore.

When both ends of the frame 74 are at the same level, the frame 74 is centrally located between the top and bottom of the cover 32. Since the frame 74 bends, and the cover 34 has rigid sections that hinge at joints 40 and 46, it will be evident that the movement of the frame 74 and cover 32 will not coincide as the level of the power plant 14 moves up and down.

FIG. 2 shows the way in which the frame 74 moves closer to the bottom of the cover 32 at the right; and closer to the top of the cover 32 toward the left and near the upper portion of the arc, when the power plant 14 is at a high level as shown in full lines in FIG. 2. FIG. 2 also shows the way in which the frame 74 shifts within the cover 32 when the power plant 14 moves to a low level. For example, the frame 74 is near the bottom of the cover 32 on the left side of the broken line position in FIG. 2, and is up near the top of the cover 32 just to the right of the top of the arc.

Means are provided for holding the frame 74 centered between the sides of the cover 32 so that the cover prevents the frame 34 from tipping either way within the cover. FIG. 3 shows such means as springs 96 and these springs not only serve as means for holding the frame 74 transversely centered in the cover 32 but they also serve as damping means. The frame 74 and the cover 32 have different periods of vibration, because of their great difference in construction, and the connections 96 joining the frame 74 with the cover 32 prevents vibration of the frame and cover since their different periods damp out incipient vibration which starts in the other.

It is, of course, necessary that the damping connections 96 be extensible because these springs 96 must stretch in order to permit the frame 74 to shift up and down toward the top and bottom, respectively, of the cover 32 in accordance with the changes in curvature of the frame 74 as already explained in connection with FIG. 2.

The line on FIG. 2 marked "MLW" represents the level of the brackets 36 for a mean low water level. The dimension H is the distance that the brackets 36 can be expected to move when there is extremely high storm tide. This may be 36 feet by way of example.

The dimension L represents the level of the bracket 36 when there is an extremely low tide. This level may be 6 feet below mean low water, by way of example.

For a change of level of 42 feet in the left hand end of the frame 74, and with a radius of curvature of approximately 60 feet, it will be apparent that the degree of bending of the cables, which is pretty evenly distributed over the full length of the frame 74, is extremely small as the arc of the frame 74 changes to accommodate this rise and fall of the power station with which the left hand end of the frame 74 is connected.

The amount of tidal level change depends greatly on geography. Depending upon the change in level which must be allowed for, it will be evident that the length of the frame 74 which must be provided in order to obtain a given maximum of flexing of the cables can be determined mathematically and the cross-section of the cover 32 necessary to accommodate the change in curvature of the frame 74 can also be computed mathematically.

The preferred embodiment of the invention has been illustrated and described, but changes and modifications can be made and some features can be used in different combinations without departing from the invention as defined in the claims.

What is claimed is:

1. A structure for supporting an electric power cable between a floating power station, that rises and falls with variations in the level of tidal water, and a second station at a fixed level, said structure comprising a stiffly flexible frame that extends upward at one end from the floating power station and that curves through an arc in a substantially vertical plane to its other end which extends downward to the fixed station, and rigid connections at both ends of the frame holding the frame on both stations and against angular movement with respect to both stations whereby change in the level of the first station with respect to the second station bends the frame throughout the full length thereof, and means on the frame for holding a power cable along the arc of said frame.

2. The structure described in claim 1 characterized by the frame being an unjointed frame made of metal structural members that bend to provide a working range of variations in the height of the first station with respect to the second station without stressing the metal beyond its elastic limit.

3. The structure described in claim 1 characterized by the frame being a metal structure extending around an arc of substantially 180° for most of the length of the frame and having straight portions beyond both ends of the arc and in substantially parallel relation to one another at both ends where the frame is connected with the stations.

4. The structure described in claim 3 characterized by the stations being at a substantially fixed horizontal distance from one another whereby changes in relative vertical positions of the stations changes the position of the arc along the length of the frame.

5. The structure described in claim 1 characterized by means connected to the frame for bracing the frame with its arcuate curvature in a substantially vertical plane.

6. The structure described in claim 1 characterized by a cover that encloses the frame, the cover having walls that protect the frame from wind and from ice formation.

7. The structure described in claim 6 characterized by the cover being made of two sections, each of which is of rigid construction, a joint connecting the sections together at an intermediate location along the length of the cover, one end of the cover being connected with the floating station and the other end being connected with the fixed station, and hinges connecting the cover to said stations.

8. The structure described in claim 7 characterized by the cover being wider than the frame in a horizontal direction, and each end of the cover being connected with its station by a hinge connection with the axis of the hinge extending for most of the horizontal width of the frame for restraining the cover from tipping out of a vertical position.

9. The structure described in claim 6 characterized by means connected with the stations for holding the cover in a vertical position, and connections between the cover and the frame at locations along the length of the frame for holding the frame against tipping out of a substantially vertical position.

10. The structure described in claim 9 characterized by the connections between the cover and the frame including connections that serve as damping devices for preventing vibrations of the cover from being transmitted to the frame.

11. The structure described in claim 6 characterized by the frame and cover having different periods of vibration, and damping connections between the frame and the cover whereby the different vibration period of one opposes the setting up of vibrations in the other.

12. The structure described in claim 6 characterized by the frame being movable toward and from the top and bottom of the cover to compensate for differences in the movements of the sections of the cover and the arcuate frame, and extensible connections between the frame and the cover.

13. The structure described in claim 12 characterized by the cover being of substantially larger cross-section than the frame so that there is clearance in the cover around the frame, the cover being of generally rectangular cross-section and having walls on all sides thereof to protect the frame, and any cable on the frame, on all sides of the frame along the upwardly extending portions of the frame, at the ends thereof, and along intermediate portions of the frame as it extends through a substantially 180° arc.

14. The structure described in claim 1 characterized by a power cable supported by the frame along the arc of curvature of the frame, and restraining structure holding the cable against displacement with respect to the frame in all directions, the restraining structure holding the cable being close enough to the neutral axis of the frame so that no relative movement between the cable and the restraining structure is necessary to accommodate the changes in the radius of portions of the frame as it flexes in response to tidal movements of the floating power station.

15. The structure described in claim 1 characterized by the frame being of substantially greater width than thickness, and retaining means at closely spaced locations along the arc of the frame, each of the retaining means having a plurality of recesses for receiving a plurality of parallel cables to be extended lengthwise along the frame.

16. A structure for supporting an electric power cable between a floating generating station, that rises and falls with variations in the level of tidal water, and a second station at a fixed level, said structure comprising a frame that extends upward at one end from the floating station and curves through an arc in a substantially vertical plane to its other end which extends downward to the second station, means on the frame for supporting a power cable in position to bend as a result of relative vertical movement of the opposite ends of the frame, the supporting means being constructed and arranged to distribute the bending of a cable over a length thereof constituting most of the distance between the floating generating station and the second station which is at a fixed level.

* * * * *